United States Patent [19]
Neal

[11] Patent Number: 5,234,533
[45] Date of Patent: Aug. 10, 1993

[54] PORTABLE HOT AIR SHEET WELDER

[76] Inventor: Charles W. Neal, 1630 Lily Ave., El Cajon, Calif. 92921

[21] Appl. No.: 790,537

[22] Filed: Nov. 12, 1991

[51] Int. Cl.$^5$ .................................. B32B 35/00
[52] U.S. Cl. .............................. 156/497; 156/499; 156/544; 156/574; 156/579
[58] Field of Search .............. 156/497, 499, 574, 579, 156/359, 71, 82, 544

[56] References Cited

U.S. PATENT DOCUMENTS

| | | | |
|---|---|---|---|
| 4,087,309 | 5/1978 | Lang | 156/497 |
| 4,440,588 | 4/1984 | Stevenson et al. | 156/157 |
| 4,533,423 | 8/1985 | Johnson et al. | 156/359 |
| 4,743,332 | 5/1988 | Black | 156/359 |
| 4,834,828 | 5/1989 | Murphy | 156/359 |
| 4,855,004 | 8/1989 | Chitjian | 156/359 |
| 4,913,772 | 4/1990 | Taylor et al. | 156/499 |

Primary Examiner—Michael W. Ball
Assistant Examiner—J. Sells
Attorney, Agent, or Firm—Charles C. Logan, II

[57] ABSTRACT

A portable hot sir sheet welder used for making reservoir liners and covers. The welder is sued to fuse together overlapped edges of lengthy sheets of synthetic rubber material or the like. The welder has a front carriage and a rear carriage both of which have a weight box for removably receiving cast ingot weights. The front carriage has a pair of laterally spaced main drive compression wheels for pressing the overlapped sheets together after they have had their surfaces heated to a sufficiently high temperature by a hot air shoe pounded on the front carriage. A pair of laterally spaced secondary compression wheels are supported from the front end of the rear carriage. An eccentric mechanism attached to the rear carriage provides structure for pivoting the main drive compression wheels upwardly from their pressure producing position.

9 Claims, 3 Drawing Sheets

PORTABLE HOT AIR SHEET WELDER

BACKGROUND OF THE INVENTION

The invention relates to hot air welding and more specifically to a portable hot air welding for fusing together adjacent overlapped sheets of synthetic rubber or like material.

One of the areas where hot air welders are used is making reservoir liners and covers. They are normally made of synthetic rubber or another type of plastic material. These covers and liners are often several hundred feet wide and they are made from elongated sheets of material that have their adjacent edges overlapped and heat welded together. In order to insure complete fusion of the overlapped edges together, a compression force is normally applied. The covers and liners are assembled at a factory location after which they are transported to their installation site.

Present day hot air sheet welders have a capability of fusing together sheets of material having a thickness of approximately 45 mils. These machines cannot get fusion for thicker sheets of material. One of the reasons for this is that the thicker materials require more compression to insure thorough sealing and fusion since no adhesives or sealants are used. The rolls of calandered synthetic rubber material are normally purchased from a manufacturer, such as Burke Environmental or J. P. S. Elastomerics or others, in widths ranging from 4 to 10 feet wide with various lengths. The fabricators that assemble the cover and sheet liners have been to provide the industry with hot air welding capable of producing fabricated products having a range of thickness between 30 mils and 120 mils. It is absolutely necessary that the hot air welders be portable since the welding operation is performed on the long lengths of material after they have been layed out in an adequately wide floor space. The present hot air welders are not capable of obtaining the necessary compression required to insure complete sealing and fusion of the overlapped sheets.

It is an object of the invention to provide a novel hot air sheet welder that is capable of fusing overlapped sheets of synthetic rubber material having a thickness as great as 120 mils.

It is also an object of the invention to provide a novel portable hot air sheet welder that has structure for varying the amount of compressive force applied overlapped sheets of synthetic rubber that have been fused together.

It is another object of the invention to provide a novel portable hot air sheet welder that is easily maneuverable while performing the fusion operation on sheets of material that are often over 100 feet long.

It is a further object of the invention to provide a novel hot air sheet welder that is economical to manufacture and market.

SUMMARY OF THE INVENTION

The novel portable hot air sheet welder has been primarily designed to be used in making reservoir liners and covers although it may be used for making other assembled structures. Sheets of synthetic rubber or types of plastic materials are generally layed out in the bay area of a building so that the adjacent sheets have a predetermined overlapped width. These sheets are often several hundred feet long and the assembled cover or liner is often several hundred feet wide.

Once the sheets of material have been layed out in their overlapped position, the portable hot air sheet welder is positioned at one end of a pair of overlapped edges and it is driven the entire length of the sheets while the fusion process is performed. The fusion process results from air being blown through a hot air shoe of the machine that has been inserted between the two overlapped edges causing their adjacent material surfaces to be raised in temperature a sufficient amount that the compression wheels of the sheet welder will press downwardly with a sufficient force to fuse the two overlapped edges together as the machine passes over their surface while continuing down the length of sheet material. The hot air sheet welder has its own electrical motor that drives its main drive compression wheel. The machine also has a secondary compression wheel that follows the main drive compression wheel as it passes over the recently fuse overlapping edges. The hot air sheet welder has a front carriage and a rear carriage and both of these have structure for receiving ingot weights that are used to provide additional compressive force to the respective main drive compression wheel and secondary compression wheel. The structures and weights supported by the respective front and rear carriages have been positioned to give as much possible downward force to their respective wheels.

The portable hot air sheet welder has an eccentric mechanism that allows the main drive compression wheels to be raised out of rolling contact. This allows the sheet welder to be easily turned about the secondary compression wheels where the majority of the weight is concentrated and the front and rear balance wheels.

The sheet welder has a four inch wide hot shoe that allows a fused seam to be made having a width up to 4 inches wide. The sheet welder can have cast weights added to or removed from it to cover a range from approximately 30 to 3200 pounds. The additional weight is required when using sheets having a thickness between 45 mils to 120 mils because they require more compression forces to fully fuse the sheets of material together.

DESCRIPTION OF THE PREFERRED EMBODIMENT

Figure 1:
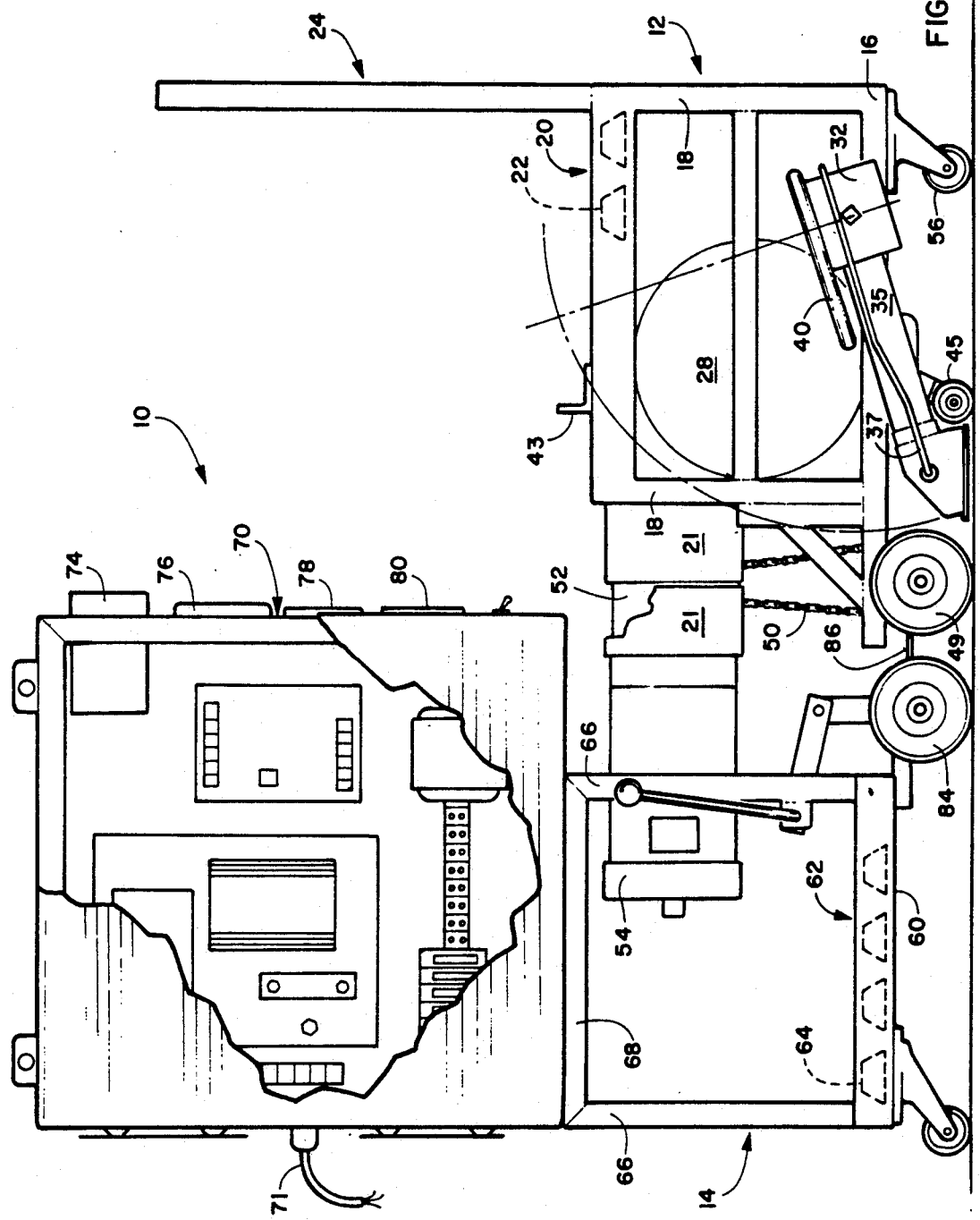
FIG. 1 is a side elevation view of the novel portable hot air sheet welder.
Figure 2:
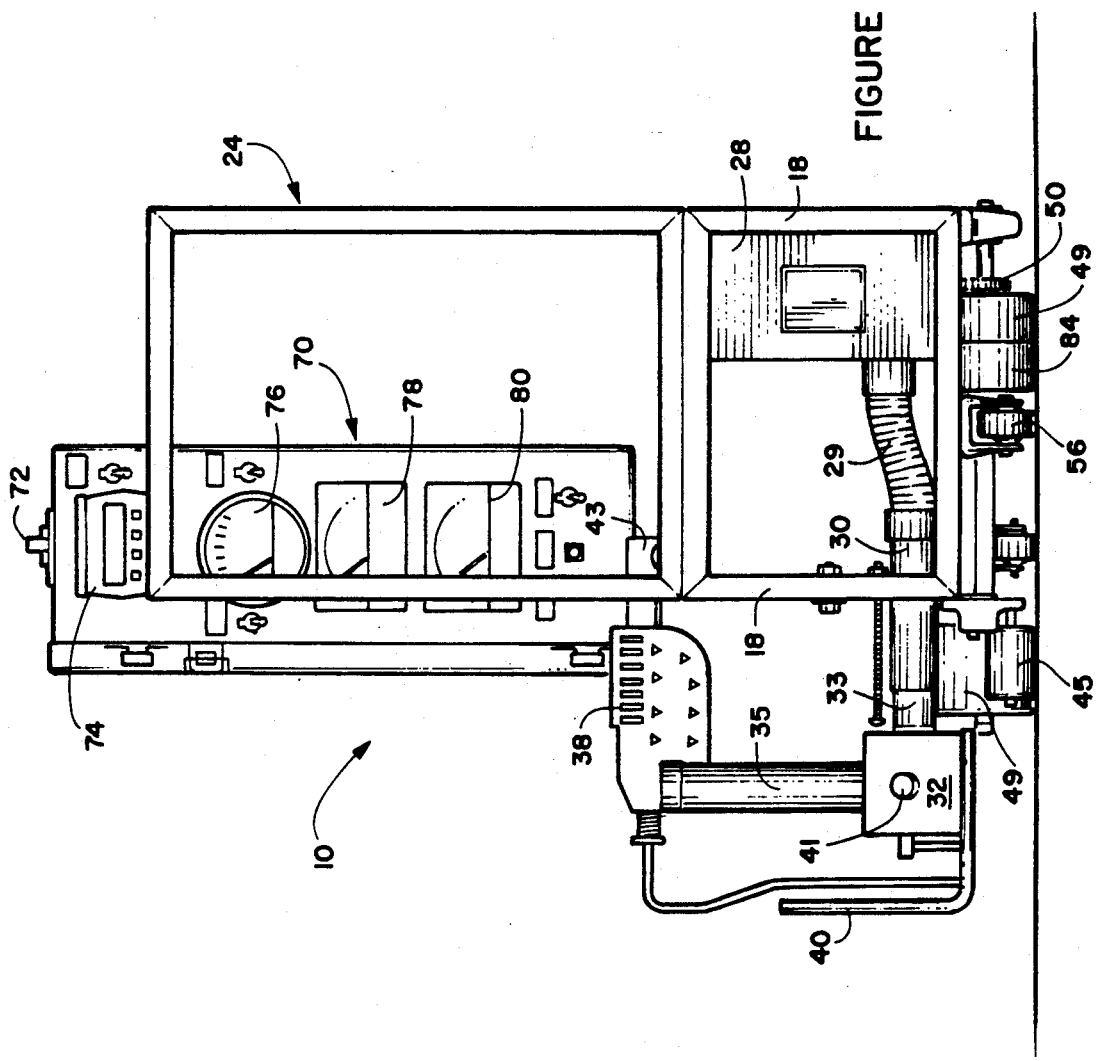
FIG. 2 is front elevation view of the novel portable hot air sheet welder.
Figure 3:
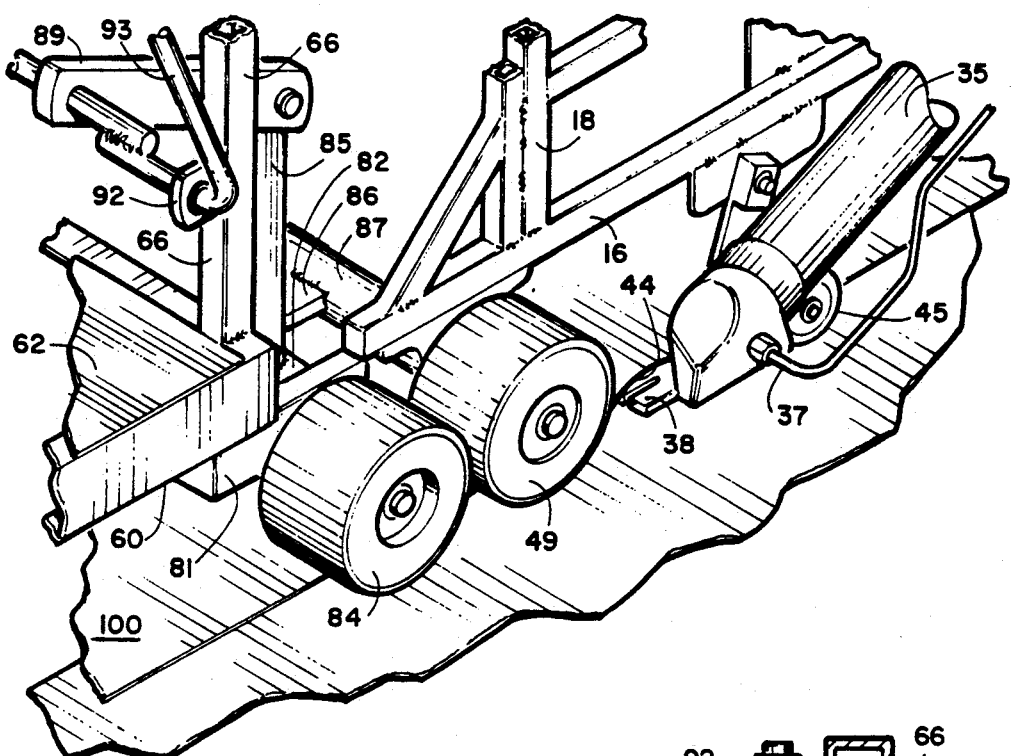
FIG. 3 is a partial perspective view of illustrating how the hot air shoe is positioned between the overlapping layers of sheet material that will be fused together.
Figure 4:
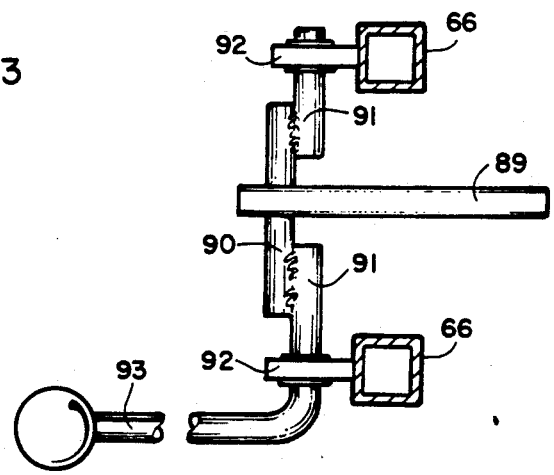
FIG. 4 is top plan view of a portion of the eccentric mechanism.
Figure 5:
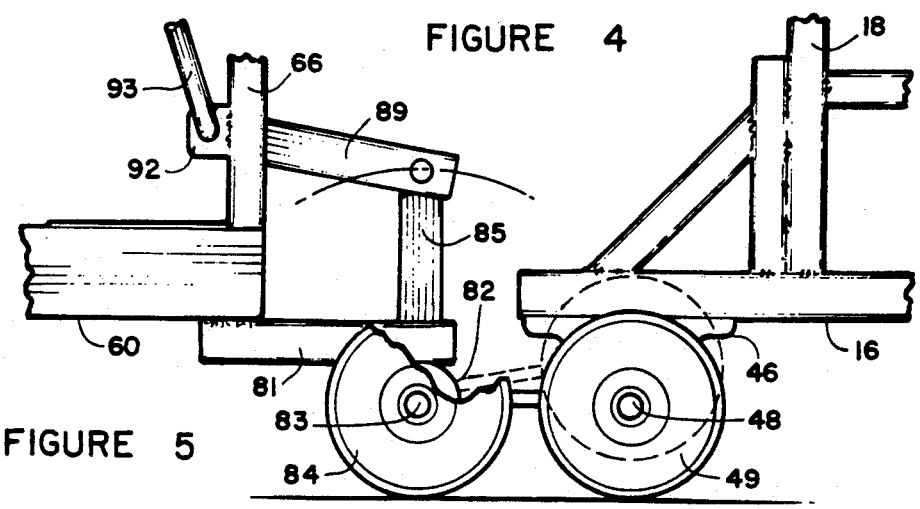
FIG. 5 is a side elevation view illustrating the eccentric mechanism.

The novel portable hot air sheet welder will now be described by referring to FIGS. 1-5 of the drawings. The sheet welder is generally designated numeral 10. It has a front carriage 12 and a rear carriage 14.

Front carriage 12 has a bottom frame 16 having a plurality of vertical posts 18 that support a top frame 19. A front weight box 20 removably receives a plurality of cast weight ingots 22. A pivotally hinged top cover would provide access to front weight box 20. Rectangular housings 21 are welder together and to post 18. Housings 21 are filled with lead and are oriented over main drive compression wheel 49. An inverted U-shaped handle 24 is attached to the front end of front carriage 12.

An air blower 28 is mounted on bottom frame 16 and it is connected to an air transfer tube 29 having a tubular end 30. An air control box 32 has a tubular sleeve 33 that is telescopically received in the end 30 of air transfer tube 29. A hot air tube 35 extends from air control box 32 into hot air shoe 38. A thermocouple 37 extends into hot air shoe 38 to register the temperature for the control computer 74 for heating the air that is forced therethrough. This hot air travels to a four inch wide hot air shoe 38 where it is directed through apertures in its front edge and heats the overlapped edges of synthetic rubber material that are being fused together. Thermocouple 37 and air blower 28 are electrically connected to a source of electrical power contained in the electrical computer control box of the sheet welder. Handles 40 and 41 are attached to the air control box so that sleeve 33 can be pulled outwardly from air transfer tube 29 and pivoted upwardly to its resting position where the hot air shoe can be positioned against the rest angle bar 43. A small material control wheel 45 is spring loaded and mounted to bottom frame 16 and its purpose is to keep the wrinkle 44 down that is formed by the top layer 100 of sheet material passing over the top surface of the hot air shoe 38.

The rear end of front carriage 12 has a pair of laterally spaced pillow block bearings 46 within which is journaled drive axle 48. A pair of laterally spaced main drive compression wheels 49 are mounted on drive axle 48. A sprocket gear (not shown) is mounted on drive axle 48 and a chain 50 passes around it and also around a sprocket gear (not shown) in gear box 52. Gear box 52 is mounted adjacent the rear end of front carriage 12 in a position primarily over the main drive compression wheels 49. A drive motor 54 is mounted in a cantilever fashion to gear box 52 and it enhances the weight that is applied to main drive compression wheel 49. A front balance coaster wheel 56 is mounted on the underside of front bottom frame 16 adjacent its front end.

Rear carriage 14 has a bottom frame 60 upon which is mounted a rear weight box 62 that removably receives cast weight ingots 64. A plurality of upright posts 66 support top frame 68. An electrical control box 70 is mounted on top frame 68. A power cord 71 is connected to the rear wall of electrical control box 70 to provide the current for running the electrical apparatus of the hot air sheet welder. A main switch 72 is found on the top of control box 70. A temperature control computer 74, an air flow meter 76, a speed control meter 78 and a line voltage meter 80 are mounted on the front wall of control box 70.

Arms 81 are connected to bottom frame 60 and extend forwardly therefrom and they support axle 83 that is journaled therein. A sleeve 82 is journaled on axle 83. A pair of laterally spaced compression wheels 84, are also journaled on axle 83. A post 85 extends upwardly from sleeve 82 and forms part of the eccentric mechanism now to be described. A plate 86 is rigidly connected to sleeve 82 and a sleeve 87 that is journaled on shaft 48. A lever 89 has its one end pivotally connected to the top end of post 85 and its front end has a short shaft 90 journaled in it and the opposite ends of short shaft 90 are connected to the broken shaft 91. The ends of broken shaft 91 are journaled in sleeves 92 that are attached to laterally spaced posts 66. A handle 93 is connected to the end of one shafts 91. Since shafts 90 and 91 have laterally offset eccentric axes, movement of handle 93 from its substantially horizontal position to an elevated position will cause main drive compression wheels to be lowered to a rolling contact surface. This is the position when hot air sheet welder is performing its fusion welding operation. Upon completion of the welding operation or when it is desirable to turn the welder to face a different direction, handle 93 would be pivoted to its horizontal position thereby rising main drive compression wheels 49 out of contact with the support surface of the welder.

What is claimed is:

1. A portable hot air sheet welder comprising:
   a front carriage having a front end, a rear end, laterally spaced sides, and a bottom frame;
   a transversely extending drive axle mounted to the bottom frame of said front carriage adjacent its rear end and having at least one main drive compression wheel thereon;
   at least one balance coaster wheel mounted to the bottom frame of said front carriage adjacent its front end;
   a rear carriage having a front end, a rear end, laterally spaced sides and a bottom frame;
   a transversely extending secondary axle mounted to the bottom frame of said rear carriage adjacent its front end and having at least one secondary compression wheel thereon;
   at least one balance coaster wheel mounted to the bottom frame of said rear carriage adjacent its rear end;
   an upper frame spaced a predetermined height above the bottom frame of said rear carriage and a plurality of vertical posts supporting said upper frame, an electrical control box is mounted on said upper frame;
   a hot air shoe mounted to said front carriage so that it is positioned adjacent the front end of said at least one main drive compression wheel;
   means for heating said hot air shoe;
   a drive motor for driving said at least one main drive compression wheel, said drive motor having a front end and a rear end, said front end being supported on said front carriage and said rear end being cantilevered rearwardly in the space between the upper frame and the bottom frame of said rear carriage thereby enhancing the weight that is applied to the main drive compression wheel of said front carriage; and
   means for raising aid at lest one main drive compression wheel to a position where it provides no support for said front carriage.

2. A portable hot air sheet welder as recited in claim 1 further comprising a rear weight box mounted on the bottom frame of said rear carriage for removably receiving a plurality of ingot shaped weights.

3. A portable hot air sheet welder as recited in claim 1 further comprising a handle attached to said front carriage to aid in steering said hot air sheet welder.

4. A portable hot air sheet welder as recited in claim 1 further comprising a front weight box spaced a predetermined height above the bottom frame of said front carriage and a plurality of vertical posts supporting said front weight box, said front weight box removably receives a plurality of ingot shaped weights.

5. A portable hot air sheet welder as recited in claim 1 wherein said hot air shoe is pivotally mounted on said front carriage so that it can be operational in a down position and at a resting upright position.

6. A portable hot air sheet welder as recited in claim 1 further comprising a spring loaded material control wheel spaced forwardly of said main drive compression wheels and extending downwardly from said front carriage.

7. A portable hot air sheet welder as recited in claim 1 wherein said means for heating said hot air shoe comprises a thermocouple positioned in front of structure connected to an air blower mounted on said front carriage.

8. A portable hot air sheet welder as recited in claim 1 wherein said means for raising said main drive compression wheels comprises an eccentric mechanism mounted on said rear carriage.

9. A portable hot air sheet welder comprising:
- a front carriage having a front end, a rear end, laterally spaced sides, and a bottom frame;
- a transversely extending drive axle mounted to the bottom frame of said front carriage adjacent its rear end and having at least one main drive compression wheel thereon;
- at least one balance coaster wheel mounted to the bottom frame of said front carriage adjacent its front end;
- a rear carriage having a front end, a rear end, laterally spaced sides and a bottom frame;
- a transversely extending secondary axle mounted to the bottom frame of said rear carriage adjacent its front end and having at least one secondary compression wheel thereon;
- at least one balance coaster wheel mounted to the bottom frame of said rear carriage adjacent its rear end;
- a hot air shoe mounted to said front carriage so that it is positioned adjacent the front end of said at least one main drive compression wheel;
- means for heating said hot air shoe;
- means for driving said at least one main drive compression wheel;
- means for raising said at least one main drive compression wheel to a position where it provides no support for said front carriage; and
- said means for raising said main drive compression wheels comprises an eccentric mechanism mounted on said rear carriage and said drive axle has a first sleeve journal thereon and said secondary axle has a secondary sleeve journal thereon, said first and second sleeves being rigidly connected to each other by a connecting member, said secondary sleeve being connected to said eccentric mechanism for raising and lowering said main drive compression wheel.

* * * * *